United States Patent [19]

Bates et al.

[11] 3,970,937

[45] July 20, 1976

[54] MODEM FOR A SUPPRESSED CARRIER COMMUNICATIONS SYSTEM

[75] Inventors: Wayne J. Bates, Des Plaines; Walter L. Berenson, Palatine; William H. Euchner, Jr., Arlington Heights; James H. Grigg, Chicago; Morton Stern, Skokie; Ronald W. Taylor, Arlington Heights, all of Ill.

[73] Assignee: Motorola, Inc., Schaumburg, Ill.

[22] Filed: Dec. 19, 1974

[21] Appl. No.: 534,388

[52] U.S. Cl. .................................. 325/49; 325/20; 325/138; 325/329
[51] Int. Cl.² .......................................... H04B 1/68
[58] Field of Search ................. 325/49, 50, 144, 64, 325/319, 55, 46, 148; 343/177, 179, 226, 175

[56] References Cited
UNITED STATES PATENTS

| | | | |
|---|---|---|---|
| 2,678,384 | 5/1954 | Beers | 325/55 X |
| 2,974,222 | 3/1961 | Lawson | 325/50 X |
| 3,042,867 | 7/1962 | Thompson | 325/50 |
| 3,147,437 | 9/1964 | Crafts et al. | 325/49 |
| 3,300,720 | 1/1967 | Kowols | 325/50 X |

Primary Examiner—Robert L. Griffin
Assistant Examiner—Robert Hearn
Attorney, Agent, or Firm—James W. Gillman; Eugene A. Parsons

[57] ABSTRACT

A modem having a transmitter portion including a first modulator connected to receive audio frequency signals and supplying an output signal through a single sideband filter to a second modulator providing an output signal at a unique channel frequency, a receiver portion including a first demodulator connected to receive transmitted signals and supplying an output signal to a second demodulator through a single sideband filter with the second demodulator providing audio frequency output signals, a carrier switch supplying a small amount of the carrier to the second modulator during operation of the transmitter and a carrier level switch associated with the carrier switch for supplying the carrier at high and low levels, and a crystal controlled channel oscillator connected to the second modulator of the transmitter portion and the first demodulator of the receiver portion with removable, plugin crystals connected thereto for controlling the channel frequency of the modem.

6 Claims, 2 Drawing Figures

MODEM FOR A SUPPRESSED CARRIER COMMUNICATIONS SYSTEM

BACKGROUND OF THE INVENTION

A great variety of multiplex equipment has evolved over the years, since the experimental beginning of frequency division multiplex equipment in 1914, in attempts to make full use of the frequency spectrum available. However, in general, these prior art systems have required the use of common equipment such as carrier supplies for signalling, groups, and super groups. None of the prior art equipment has total flexibility in that none of the prior art equipment provides identical modems without common equipment capable of placing a CCITT (International Telegraph and Telephone Consultative Committee) compatible 4kHz sideband directly onto the baseband frequency spectrum.

SUMMARY OF THE INVENTION

The present invention pertains to a modem for use in a suppressed carrier, communications system including at least two, spaced apart, transmitter receivers wherein a portion of the carrier is transmitted for use as a synchronizing signal, which modem includes a transmitter portion with a first modulator connected to receive audio frequency signals and supply an output signal to a second modulator through a bandpass filter, the second modulator supplying an output signal at a unique channel frequency, a receiver portion with a first demodulator connected to receive signals from a receiver of the communications system and supply an output signal to a second demodulator through a bandpass filter, said second demodulator providing audio frequency signals at the output thereof, carrier frequency supplying means connected to the first modulator and the second demodulator, a crystal controlled channel oscillator connected to the second modulator and the first demodulator and having variable frequency controlling means for controlling the channel frequency at which the modem operates, and means for introducing a small portion of the carrier into the second modulator at either a first or a second level for transmission and synchronization of any communicating modems.

It is an object of the present invention to provide an improved modem for use in a suppressed carrier, communications system.

It is a further object of the present invention to provide a modem capable of being converted for use at any channel frequency in the available frequency spectrum and which provides two levels of carrier signal in the output for signalling and the like.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
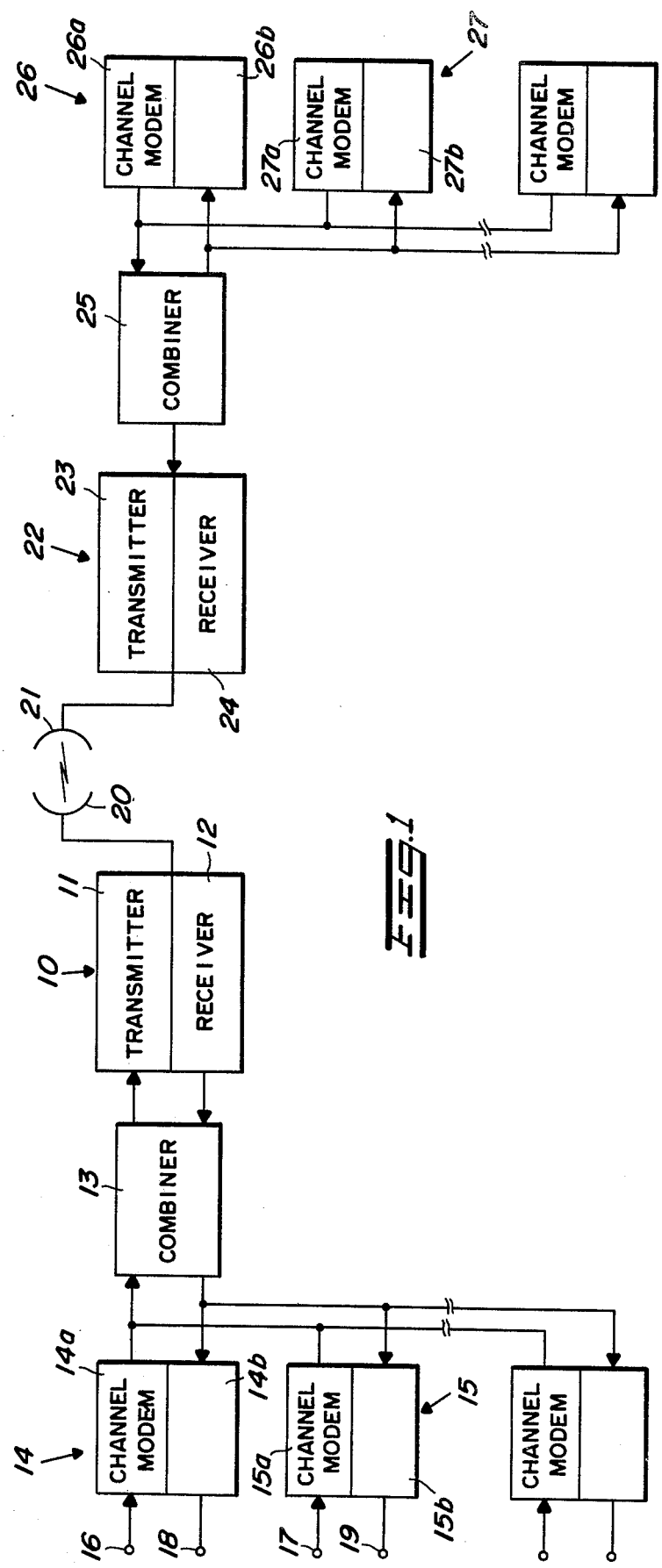
FIG. 1 is a block diagram of a suppressed carrier, communications system including multiplexing.

Referring specifically to FIG. 1, a transceiver generally designated 10, including a transmitter 11 and a receiver 12, which forms a portion of the communications link, is illustrated. A combiner or multiplexer 13 combines or multiplexes signals from a plurality of channel modems 14, 15, etc. for application to the transmitter 11 and separates signals from the receiver 12 for application to the appropriate modems. Each of the channel modems, 14, 15, etc. receives input signals, which may be for example voice frequency signals from a telephone trunk, at inputs thereto designated 16, 17, etc., respectively. The transmitter 11 supplies signals to an antenna 20 which transmits signals to a remotely located antenna 21 connected to a transceiver, generally designated 22, including a transmitter 23 and a receiver 24. The remotely located unit is similar to the above described unit and includes a combiner 25 attached to a plurality of modems 26, 27, etc. In this system the transceiver 22, combiner 25 and modems 26, 27, etc., are identical to the transceiver 10, combiner 13, and modems 14, 15, etc., and it should be understood that, while only two units are illustrated, more such units can be included.

Each of the modems 14, 15, 26 and 27 are separated into an *a* and *b* portion, appropriately designated, which are the transmitter portion and the receiver portion thereof, respectively. Since a large number of modems are connected to the transceivers 10 and 22 through the combiners 13 and 25, the transceivers are essentially operating continuously and simply form a communications link for any pair of modems which may be communicating with each other. It should be understood, therefore, that when "master" and "slave" transmitters and receivers are referred to in the following description the transmitter portions *a* and receiver portions *b* of communicating modems are being referred to, and not the communicating link transceivers 10 and 22. However, when a smaller system not incorporating multiplexing is utilized the communicating transceivers may actually be controlled as will be described below.

Figure 2:
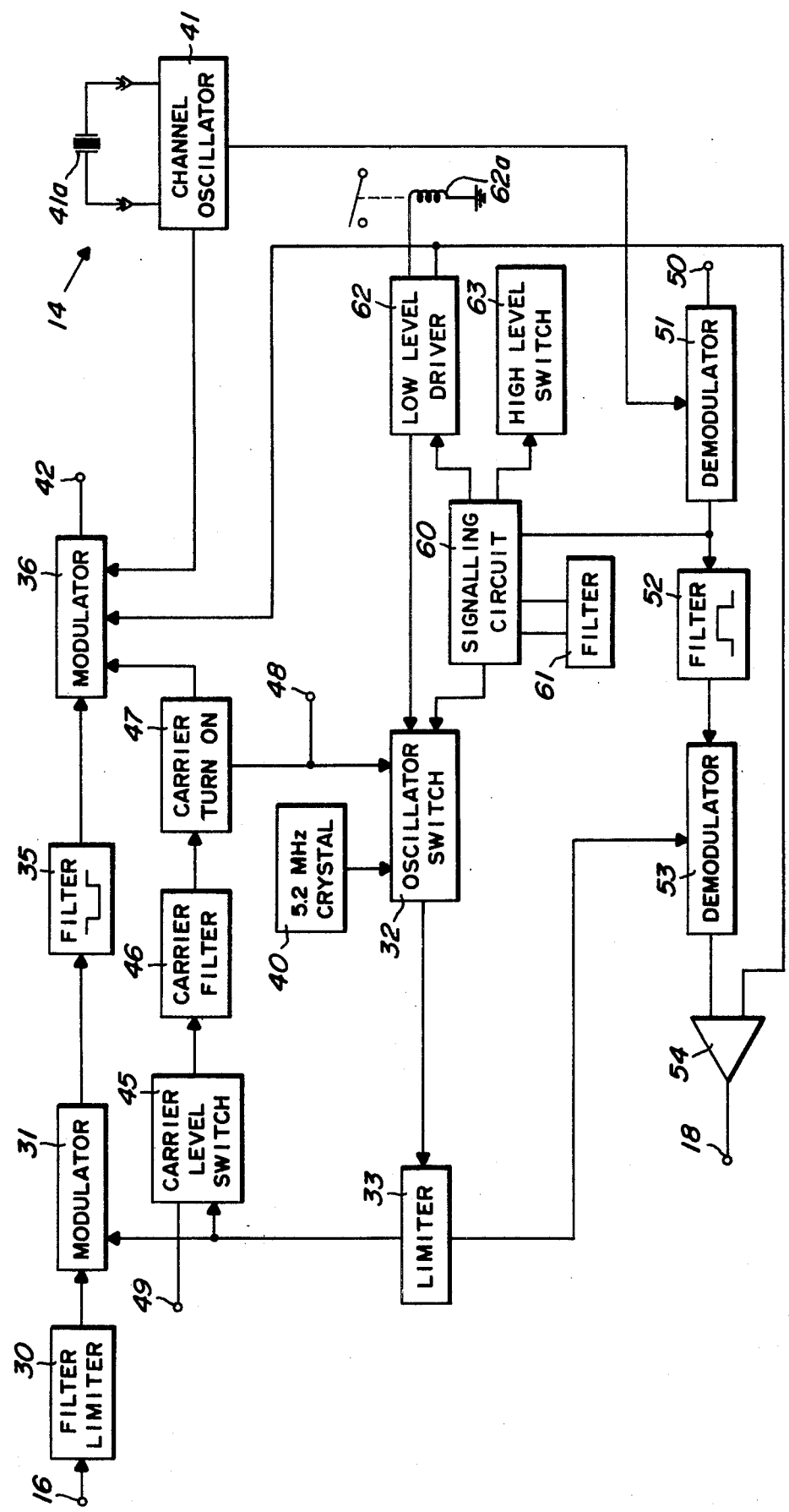
FIG. 2 is a detailed block diagram of a portion of the apparatus illustrated in FIG. 1.

Referring specifically to FIG. 2, a more detailed block diagram of modem 14 is illustrated. It should be understood that all of the modems are identical and, while only modem 14 is described in detail, the description will apply equally well to all of the remaining modems. The input signal appearing at the input terminal 16 is applied through a filter and limiting circuit 30 to a first modulator 31. The first modulator 31 receives a high frequency carrier, which is applied from an oscillator/switch 32 through a limiter circuit 33. The oscillator/switch circuit 32 is described in more detail in co-pending application Ser. No. 534,537, filing date Dec. 19, 1974, entitled "Automatic Master-Slave Carrier Switching Circuit," assigned to the same assignee. The modulated signal from the modulator 31 is applied through a special bandpass, or single sideband filter 35 to a second modulator 36. The modulators 31 and 36 and the filter 35 form the essential parts of the transmitter portion 14*a* of modem 14 along with several control functions to be described presently. The frequency supplied by the oscillator/switch 32 is chosen so that it is sufficiently high to allow the filter 35 to be constructed very small, while not being so high that difficulties, such as shielding and interaction between components, will occur. In the present embodiment, the oscillator/switch 32 is controlled by a 5.2 megahertz crystal 40 which is believed to be a near optimum frequency for the purposes described. The filter 35 is constructed to pass only the upper sideband from the modulator 31 and to remove the carrier and the lower sideband.

The second modulator 36 is in essence a mixer that receives a signal from a channel oscillator 41, which signal is equal in frequency to the carrier plus or minus the frequency of the channel. The frequency of the channel oscillator 41 is determined by some variable frequency controlling means, which in the embodiment of FIG. 2 is a removable, plugin crystal 41a. The frequency of the channel oscillator 41 controls the unique channel frequency of the modem 14 and the modem 14 may be quickly adapted for use on different channels by removing the crystal 41a and substituting a new crystal at the desired frequency. It should be understood that the channel oscillator 41 might have incorporated therein other frequency controlling means, such as a frequency synthesizer, or any other desired means for quickly changing the channel frequency. The removable plugin crystal 41a is illustrated as the means for changing the frequency of the channel oscillator 41 because it is the simplest and least expensive structure for adapting the modem 14 to any desired channel. The modulator 36 supplies an output signal to the combiner 13 on a lead 42 which is the difference frequency between the signals supplied to the modulator 36 by the filter 35 and the signals supplied by the channel oscillator 41. The signal on the lead 42 is combined with other signals, each having a characteristic channel frequency, in the combiner 13 and transmitted by the transmitter 11.

The modulator 36 also receives a small portion of the carrier from the limiter 33 through a carrier level switch 45, a carrier filter 46 and a carrier turn-on circuit 47. The carrier turn-on circuit 47 is, in this embodiment, a transistor switch which operates in response to a continuous or coded intermittent signal on a terminal 48 attached thereto. The terminal 48 may be connected to receive a signal when the transmitter portion 14a of the modem 14 is operated. For example, the operation of the transmitting portion 14a of modem 14 may be initiated by a button on a microphone (not shown), which button also supplies a continuous signal to the terminal 48 as long as the button is operated. The carrier turn-on circuit 47 allows a carrier signal to be supplied to the modulator 36 as long as the turn-on circuit 47 is activated by a signal on the terminal 48. The carrier filter 46 is tuned to pass only the carrier fundamental frequency from the limiter 33 so that a pure carrier signal is supplied to the modulator 36. The carrier turn-on circuit 47 also mutes the modulator 36 when a signal is not being supplied to the terminal 48, which removes the channel from the base-band and minimizes the loading on the transmission facility.

The carrier level switch 45 provides first or second levels of carrier signal at the output thereof. In the present embodiment, the carrier level switch 45 normally supplies a first level of carrier and, when a signal is applied to a terminal 49, connected thereto, the carrier level switch 45 supplies a second level of carrier. The carrier level switch 45 is preset to apply to the input of the modulator 36 a first level of carrier 18db below a predetermined level of modulated signal in the modulator 36 (in this embodiment, a special channel test signal). The second level of carrier from the level switch 45 is substantially higher and, in the present embodiment, is 15db higher or approximately 3db below the predetermined level of modulated signal applied to the modulator 36. A signal may be applied to the terminal 49 to raise the level of the carrier level switch 45 output whenever the second or upper level of carrier is to be utilized for signalling or the like, as will be explained presently.

Any signals intended for the modem 14 are received by the receiver 12 and applied through the combiner 13 to an input terminal 50 of the modem 14, which applies the signals to a first demodulator 51. Demodulator 51 is essentially a mixer that receives the unique channel signal from the channel oscillator 41 and provides the difference frequency through a single sideband filter 52, which is similar to filter 35, to a second demodulator 53. Demodulators 51 and 53 and filter 52 form the essential parts of the receiver portion 14b of the modem 14 along with several control functions to be described presently. The channel oscillator 41 provides a unique channel frequency which, when mixed with the input signal from terminal 50 in demodulator 51, produces a difference frequency that will pass through the single sideband filter 52. All other input signals mixed with the output of the channel oscillator 41 in the demodulator 51 are rejected and only the signals specifically intended for modem 14 reach the demodulator 53. The demodulator 53 receives a carrier signal from the oscillator/switch 32 through the limiter 33 and demodulates the input signal to supply the desired unmodulated, audio frequency signal through an amplifier 54 to the output lead 18.

A portion of the signal from the demodulator 51 is applied to a signalling circuit 60 which includes a very narrow filter 61 for removing the carrier from the signal applied thereto. Whenever a carrier is present, that is the modem 14 is receiving a signal at its characteristic channel frequency, a signal is supplied from the circuit 60 to a low level driver circuit 62 which provides an indication of a received signal, for example by operating a relay 62a. The low level driver 62 unmutes the modulator 36 to allow a ringback signal to the communicating modem at the other end of the channel which initiated the signal received by the modem 14. The relay 62a may be also connected to the amplifier 54 to provide an unmuting signal to the amplifier 54 which opens, or unmutes, the amplifier 54 when the low level driver 62 is operated. Thus, the receiver portion 14b may be normally muted and only unmuted when a proper signal is received thereby. The low level driver 62 also supplies a signal to the oscillator/switch 32 to cause the oscillator/switch 32 to operate as set forth in detail in the above-described co-pending application. The oscillator/switch 32 supplies a carrier from the oscillator portion thereof when a signal is supplied from the terminal 48 before a signal is supplied from the low level driver 62 and the carrier is provided from the signalling circuit 60 when a signal is supplied by the low level driver 62 before a signal is applied to the terminal 48. With the carrier supplied by the oscillator portion of the oscillator/switch 32 the modem 14 operates as the master and with the carrier supplied by the signalling circuit 60 (i.e. the carrier removed from the received signal) the modem 14 is slaved to a remote modem.

A high level switch is also connected to the signalling circuit 60 and senses when the carrier is at a high level.

In the present embodiment the low level driver 62 operates whether a low level or high level carrier is present in the signalling circuit 60 and the high level switch 63 operates only when the carrier is at a high level. The high level switch 63 may be utilized to operate a variety of functions such as, for example, turning on remote transmitters at unmanned microwave stations, etc. The transmitter portion of the remote modem communicating with the modem 14 to supply the high level carrier operates exactly the same as the transmitter portion of modem 14, i.e. a signal is applied to terminal 49 to operate the carrier level switch 45 and remove some attenuation from the carrier path so that a high level of carrier is applied through the carrier filter 46. Simultaneously a signal must be applied to the terminal 48 to operate the carrier turn-on switch 47 and unmute the modulator 36. A high level of carrier is then transmitted and sensed by the high level switch 63 in the receiver portion of the remotely located modem.

Thus, a modem for use in a suppressed carrier, communications system is disclosed which is capable of supplying at least two levels of carrier for signalling purposes and which include transmitter and receiver muting circuits for improving the operation of the system. Further, the unique channel frequency of each modem is controlled by a channel oscillator which has variable frequency controlling means associated therewith. Generally, the channel oscillator is controlled by a removable plugin crystal so that modems may be quickly and easily replaced to greatly reduce down time during maintenance. Further, each modem can be quickly converted to any channel in the available spectrum by simply removing the channel crystal therein and inserting a new crystal. This greatly improves the amount of equipment, original and spare, necessary and greatly increases the versatility of the available equipment.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In a suppressed carrier, communications system including at least two, spaced apart, transmitter-receivers wherein a portion of the carrier is transmitted for use as a synchronizing signal, a modem comprising:
   a. a transmitter portion including a first modulator connected to receive audio frequency signals and supplying an output signal to a second modulator through a bandpass filter, the second modulator supplying an output signal at a unique channel frequency to one of the transmitters of the communications system;
   b. a receiver portion including a first demodulator connected to receive signals from the receiver of the communications system associated with the one transmitter and supplying an output signal to a second demodulator through a bandpass filter, the second demodulator providing audio frequency signals at the output thereof;
   c. carrier frequency supplying means connected to the first modulator of said transmitter portion and the second demodulator of said receiver portion;
   d. a crystal controlled channel oscillator connected to the second modulator of said transmitter portion and the first demodulator of said receiver portion, said channel oscillator having a variable frequency controlling means connected thereto including a replaceable plug-in crystal for controlling the channel frequency at which the modem operates;
   e. means for introducing a small portion of the carrier from the carrier frequency supplying means to the second modulator of the transmitter portion for synchronization of any communicating modems; and
   f. switch means connected to said carrier introducing means for providing first and second levels of carrier signal with the first level being substantially lower in amplitude than the second level to perform signalling functions.

2. A modem as claimed in claim 1 including separating means associated with the receiver portion for separating carrier signals from received signals, first level means connected to receive separated carrier signals from said separating means and provide an output signal whenever the separated carrier signal is at a first level, and second level means connected to receive separated carrier signals from said separating means and provide an output signal whenever the separated carrier signal is at a second level.

3. A modem as claimed in claim 2 wherein the first level means includes circuitry for providing an output signal whenever a separated carrier signal is received.

4. A modem as claimed in claim 2 wherein the first level of the carrier signal supplied to the second modulator of the transmitter portion is approximately 15db lower than the second level of the carrier signal supplied to the second modulator.

5. A modem as claimed in claim 1 wherein the bandpass filters in the transmitter and receiver portions of the modem are similar and are tuned to pass one sideband of the output signal from the first modulator and first demodulator, respectively.

6. A modem as claimed in claim 1 including in addition transmitter muting means for muting the transmitter when the transmitter is not being operated and receiver muting means for muting the receiver when no received signals are present.

* * * * *